US006404893B2

(12) United States Patent
Iori

(10) Patent No.: US 6,404,893 B2
(45) **Date of Patent: *Jun. 11, 2002**

(54) METHOD FOR PRODUCING SOUNDTRACKS AND BACKGROUND MUSIC TRACKS, FOR RECREATIONAL PURPOSES IN PLACES SUCH AS DISCOTHEQUES AND THE LIKE

(75) Inventor: Enrico Iori, Modena (IT)

(73) Assignee: IK Multimedia Production S.r.l., Modena (IT)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/953,768

(22) Filed: Oct. 17, 1997

(30) Foreign Application Priority Data

Jun. 9, 1997 (IT) ....................................... M097A0105

(51) Int. Cl.[7] .................................................. H04B 1/00
(52) U.S. Cl. ...................................................... 381/119
(58) Field of Search ................................ 381/124, 119; 84/609

(56) References Cited

U.S. PATENT DOCUMENTS

| | | | | | |
|---|---|---|---|---|---|
| 4,852,910 | A | * | 8/1989 | Taffer | 283/67 |
| 5,616,876 | A | * | 4/1997 | Cluts | 84/609 |
| 5,619,425 | A | * | 4/1997 | Furnahashi et al. | 364/514 R |
| 5,712,438 | A | * | 1/1998 | Nakata | 84/622 |
| 5,726,909 | A | * | 3/1998 | Krikorian | 364/514 R |
| 5,734,731 | A | * | 3/1998 | Marx | 381/119 |
| 5,768,126 | A | * | 6/1998 | Frederick | 364/400.01 |
| 5,809,246 | A | * | 9/1998 | Goldman | 395/200.47 |
| 5,824,933 | A | * | 10/1998 | Gabiriel | 84/609 |
| 5,915,288 | A | * | 6/1999 | Gabriel | 84/609 |

* cited by examiner

*Primary Examiner*—Minson Oh Harvey
(74) *Attorney, Agent, or Firm*—Guido Modiano; Albert Josif; Daniel O'Byrne

(57) ABSTRACT

A method for producing soundtracks and background music tracks, for recreational purposes, in places such as discotheques and the like, comprising the steps of:

combining together a plurality of sounds taken from a plurality of groups of sounds, each group grouping mutually compatible sounds, so as to obtain combinations of sounds; and arranging in a given sequence the combinations of sounds, so as to obtain a composition of sounds in which duration and volume can be adjusted by the user.

13 Claims, 3 Drawing Sheets

METHOD FOR PRODUCING SOUNDTRACKS AND BACKGROUND MUSIC TRACKS, FOR RECREATIONAL PURPOSES IN PLACES SUCH AS DISCOTHEQUES AND THE LIKE

BACKGROUND OF THE INVENTION

The present invention relates to a method for producing soundtracks and background music tracks, particularly for recreational purposes, in places such as discotheques and the like.

More particularly, the present invention relates to a method for creating, both randomly and under the control of the user, soundtracks and background music tracks. It is known that compact discs are currently available which contain a large number of sounds, for creating soundtracks or music backgrounds, which can be selected individually by the user by means of software and can be mixed together in order to obtain music tracks which are then read by a personal computer.

The above method, however, is rather long and troublesome, entails using numerous sources and programs and is not suitable for being performed in real time, for example in a discotheque or during a live performance, where sound mixing must be performed in a very short time in order to play it back to the audience immediately.

SUMMARY OF THE INVENTION

The aim of the present invention is to provide a method for producing soundtracks and background music tracks which can be both user-selectable and different each time but harmonically correct.

Within the scope of this aim, an object of the present invention is to provide a method for producing random soundtracks and background music tracks by means of a CD-ROM which can be used interactively by the user even during live performances.

Another object of the present invention is to provide a method for producing soundtracks and background music tracks having a high digital audio quality.

Another object of the present invention is to provide a method for producing soundtracks and background music tracks which can be used on a personal computer.

Another object of the present invention is to provide a method for producing soundtracks and background music tracks which does not require specific musical knowledge on the part of the user.

This aim, these objects and others which will become apparent hereinafter are achieved by a method for producing soundtracks and background music tracks, particularly for recreational purposes, in places such as discotheques and the like, characterized in that it comprises the steps of:

combining together a plurality of sounds taken from a plurality of groups of sounds grouped into one or more macrogroups, so as to obtain combinations of sounds; and arranging in a given sequence said combinations of sounds, so as to obtain a composition of sounds in which duration, volume and panning (stereophonic position) can be adjusted by the user.

BRIEF DESCRIPTION OF THE DRAWINGS

Further characteristics and advantages of the present invention will become apparent from the following detailed description of a preferred but not exclusive embodiment of the method according to the invention, illustrated only by way of non-limitative example in the accompanying drawings, wherein.

DESCRIPTION OF THE PREFERRED EMBODIMENT

With reference to the above figures, the method according to the present invention comprises an initial step, in which one or more macrogroups of audio files are displayed to the user on display means, such as a personal computer monitor, each macrogroup being constituted by a plurality of sounds (or audio files) stored beforehand on a recording medium such as for example a CD-ROM.

Each audio file is therefore constituted by a sampled sound; moreover, within the same macrogroup the sounds (or audio files) are mutually musically compatible if played simultaneously in terms of harmony, tempo, duration or multiple/submultiples thereof, and consistent composition pattern, and are in turn grouped into groups which are mutually compatible in terms of the instrument or category of instruments by which they are produced.

In this manner, for example, it is possible to virtually have a group of audio files for every existing musical instrument.

In each macrogroup, therefore, the sounds, i.e., the audio files, are chosen so that any two or more sounds chosen within a group of audio files (said group being defined according to the instrument from which said sounds originate) are, as mentioned, musically mutually compatible when they are played simultaneously.

Each group of audio files contains sounds related to a given musical instrument, and it is therefore possible to have a virtually very large number (equal to the number of instruments to be reproduced) of said groups, the size of each group being limited exclusively by the memory capacity of the recording medium.

It is also possible to have audio files related to special sound effects which cannot be related directly to any musical instrument.

Each macrogroup contains a plurality, from 1 to m, of audio files (not shown in the various figures); within each macrogroup, furthermore, each group contains a plurality, from 1 to n (where n is smaller than, or equal to, m), of audio files (or sounds).

Each sound of a group can be played back endlessly and repetitively, entering a so-called loop cycle.

The audio files are stored on a CD or on a hard disk or can be loaded from the network in a personal computer.

The various macrogroups of audio files, not shown in the figures, are then sent from the CD (step 3) or from the network (step 4) or from the hard disk (step 2) to means (5) for displaying and selecting the macrogroups.

Figure 1:
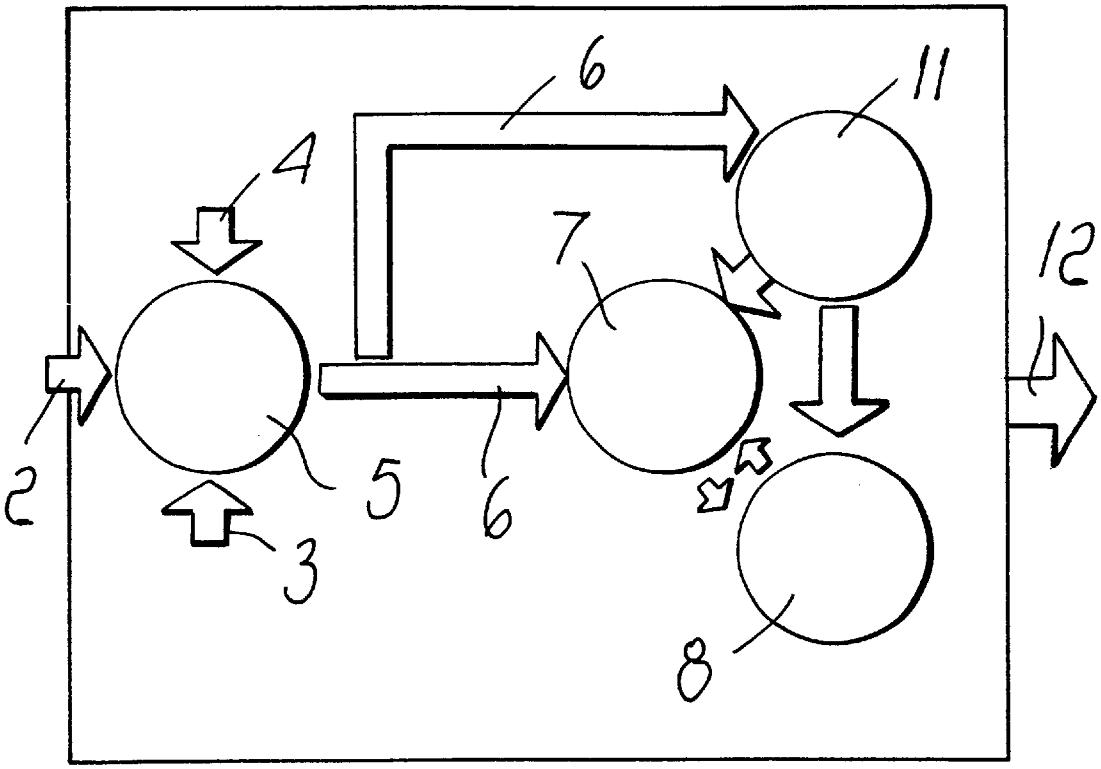
FIG. 1 is a general block diagram of the method according to the invention for producing random soundtracks and background music tracks.
Figure 2:
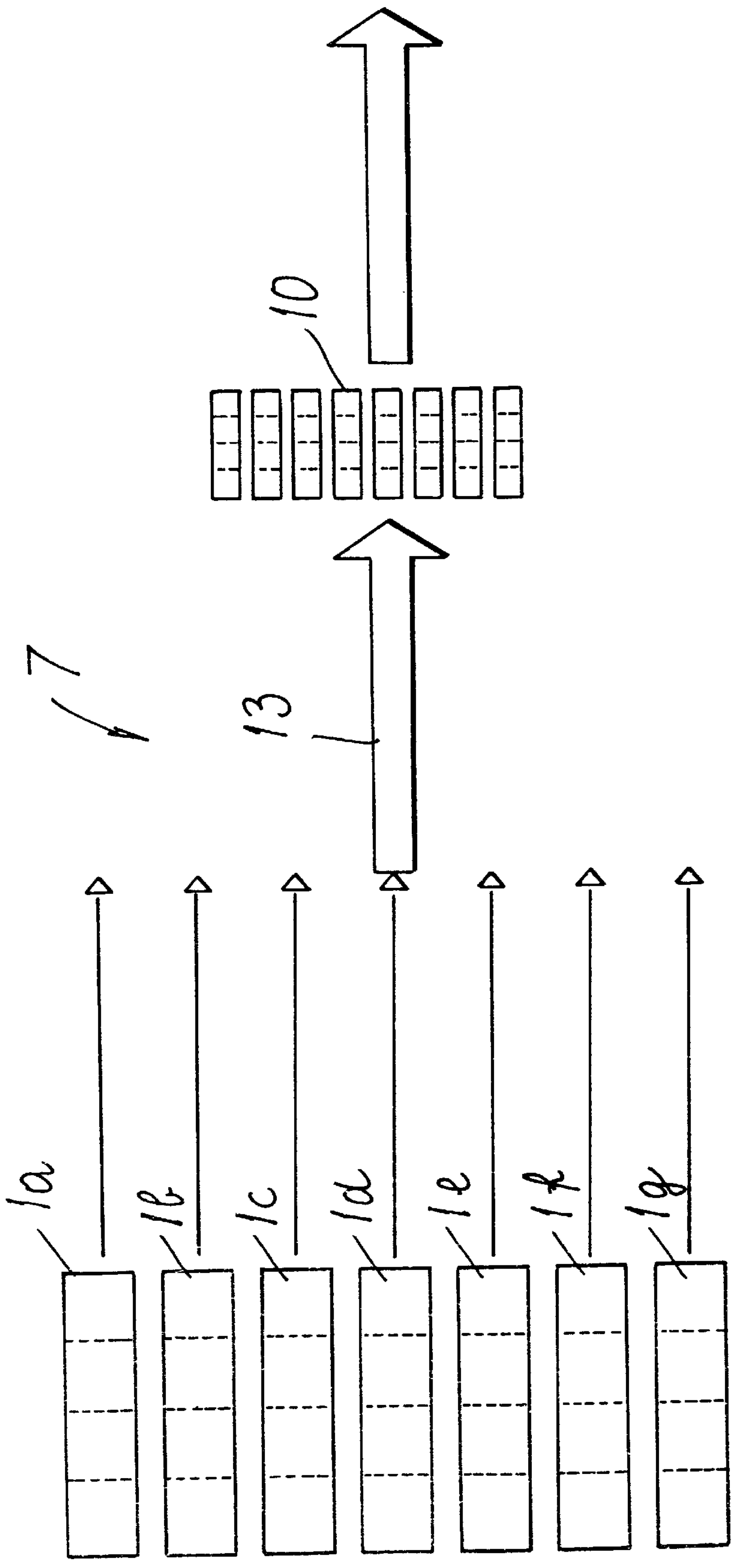
FIG. 2 is a detailed block diagram of a step of the method according to the present invention.

Once the macrogroup has been selected, it is sent (step 6) to means (7, 11) for displaying, selecting and combining the audio files that belong to the various groups, designated by the reference numerals 1*a*–1*g* in FIG. 2, in order to allow to select, among said groups, the chosen audio files and combine them at will with each other.

These steps will be described in detail hereinafter with reference to the accompanying figures.

This combination, by virtue of the means 7, is performed directly by the user by pressing software-buttons provided on a screen display: a plurality of combinations of sounds, generally designated by the reference numeral 10, is thus obtained, said combinations being produced either manually by the user or automatically by means of predefined algorithms.

The combinations 10 thus defined are sent from the means 7 to sequencing means 8, which arrange in a chosen sequence the individual combinations of audio files in order to create a final musical combination.

As an alternative, by virtue of the means 11, the combination is performed automatically by a suitable program installed in the personal computer, which uses additional predefined algorithms both to combine audio files and to sequence the resulting combinations according to various musical styles.

Figure 3:
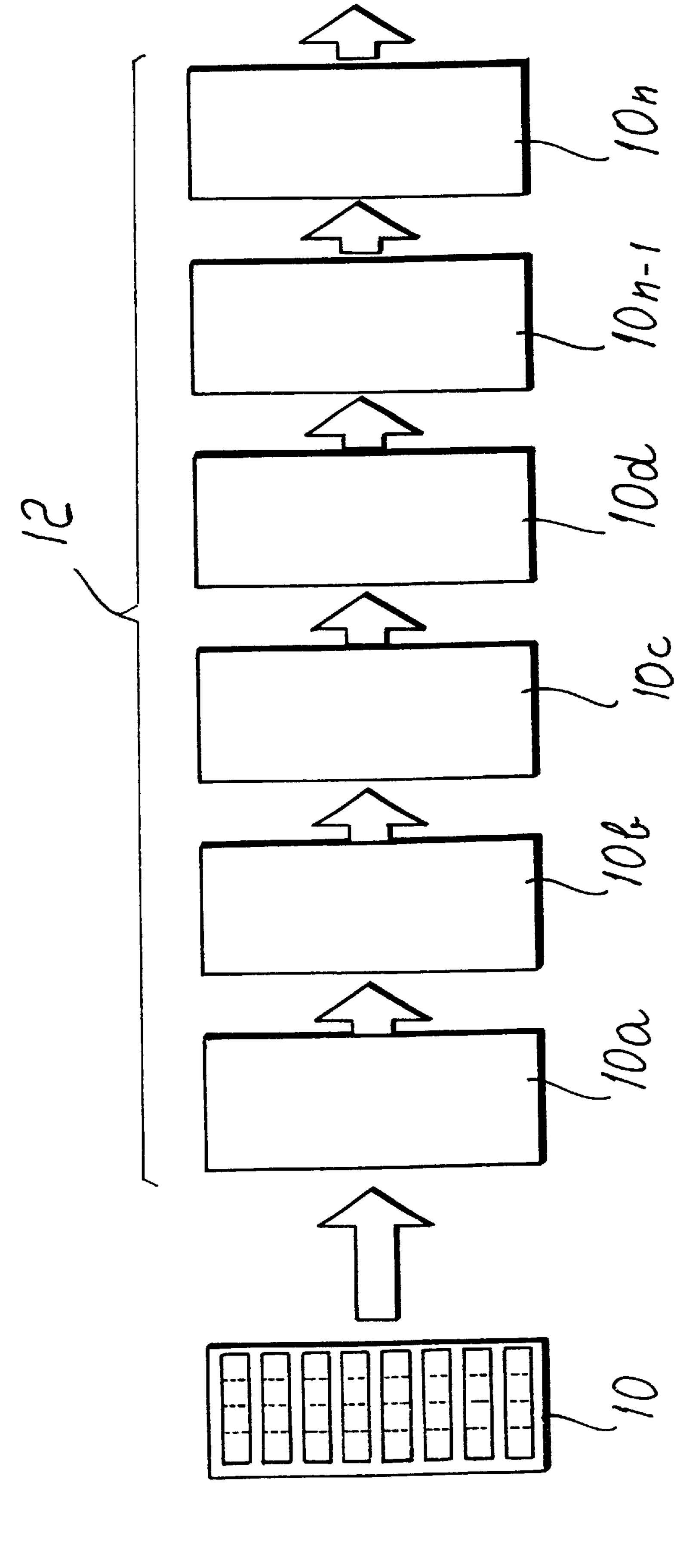
FIG. 3 is a detailed block diagram of a further step of the method according to the invention.

FIG. 3 illustrates the step for sequencing the individual combinations, which are designated in detail by the reference numerals 10*a*, 10*b*, 10*c*, 10*d*, . . . , 10*n*–1, 10*n*.

Each combination 10 (10*a*. . . 10*n*) therefore comprises a suitable set of audio files taken, in the chosen number, from the chosen audio file groups 1*a*–1*g*, according to the choice of the user or to the grouping algorithm involved, if the creation of the combinations 10 is entrusted directly to the personal computer (by means of algorithms which are predefined according to the musical styles to be obtained).

For example, it is possible to group the audio files taken from each group 1*a*–1*g* according to the style (step 13) to be obtained, and if the personal computer performs the combination (by virtue of automatic display, selection and combination means 11 which are conveniently constituted by a program), the resulting combinations 10 (10*a*–10*n*) are always within a very large number of combinations.

Otherwise, the choice of the combination is assigned to the user by means of the software buttons, as explained above.

The choice of the set of samples taken from each group of audio files 1*a*–1*g* and the subsequent combination (performed randomly or according to a predefined style) of the various audio files, i.e., of the various samples in a given combination 10*a*–10*n*, causes each combination to be in most cases different from all the others.

The final result is therefore a composition 12 of sounds which can be repeated endlessly in a cycle. The repetition consists in playing back, in an infinite cycle, the entire sequence constituted by the plurality of combinations.

These combinations of sounds 10 (10*a*–10*n*) can be played back in the chosen sequence by virtue of the sequencer 8 or, if they originate from the automatic selection and combination means 11, they can be arranged automatically in sequence and possibly re-edited by the sequencer 8.

FIG. 2 illustrates in detail the steps for the creation of the combinations 10 of audio files, both with the intervention of the user and automatically.

As already explained earlier, each combination of sounds 10 is the result of a grouping, performed randomly or according to preset and likewise random styles, of audio files belonging to a plurality of groups 1*a*–1*g* of audio files.

FIG. 3 instead illustrates the step for sequencing the various combinations 10 of audio files in the sequence chosen by the user or according to different styles, automatically and with a user-selected or random duration.

The individual combinations 10 obtained by the combination-generating means 7 or 11 can be both played back and stored by the user, and the sequence of combinations (which constitute the compositions 12) obtained by the sequencer 8 can in turn be played back and stored.

Moreover, within the individual compositions 10, the volume and panning (stereophonic position) of the individual audio files can be changed at will by the user.

Each combination 10 that is created (even automatically and randomly by the personal computer) can optionally be modified at will by the user, changing the audio files that compose it, for example adding some, removing others and storing them again.

Once the sequences of combinations 10 have been obtained, those sequences can in turn be modified by the user (even if the sequences are generated automatically by the personal computer) by passing again through the audio file combination generation means 7.

Modification of the resulting sequence consists in varying the arrangement of the various combinations 10 in the sequence.

In practice, it has been observed that the method according to the present invention fully achieves the intended aim and objects, since it allows a user, manually or automatically by means of a computer, to produce soundtracks and background music tracks of high audio quality without specific musical knowledge on the part of the user.

The user can also interact with the various audio files within the application program, transforming it into a substitute of a musical instrument and thus being able to play back sounds during a live performance.

The number of combinations of sounds that can be obtained starting from a plurality of different audio files is very large, and when said sound combinations are generated by said computer, they are almost always different from each other every time.

The above-described method can be implemented by means of a suitable multimedia program, so that it can be used wherever a personal computer is available.

In this manner, for example in a discotheque, it is possible to replace the sound system with a conventional personal computer and with the multimedia program that implements the method according to the present invention.

The method thus conceived is susceptible of numerous modifications and variations, all of which are within the scope of the inventive concept; all the details may also be replaced with other technically equivalent elements.

What is claimed is:

1. Method for producing soundtracks and background music tracks, particularly for recreational purposes, comprising the steps of:

a) providing a plurality of macrogroups, each macrogroup consisting of a plurality of audio files constituted by sample sounds which are mutually musically compatible if played simultaneously in terms of harmony, tempo and duration;

b) assigning each audio file in a macrogroup to a group of audio files according to a musical instrument from which the corresponding sampled sound originates;

c) selecting a plurality of audio files from a macrogroup;

d) randomly combining together said plurality of selected audio files into a combination of audio files;

e) repeating steps (c) and (d) so as to obtain a plurality of combinations of audio files; and f) randomly arranging in a sequence said plurality of combinations of audio files.

2. The method according to claim 1, wherein each of the audio files in a macrogroup is repeatable in a endless loop.

3. The method according to claim 1, wherein the step of selecting a plurality of audio files from a macrogroup comprises selecting audio files from at least two of said groups audio files.

4. The method according to claim 1, wherein the step of selecting a plurality of audio files from a macrogroup is performed by means of software buttons in a multimedia program.

5. The method according to claim 1, wherein the step of selecting a plurality of audio files from a macrogroup is performed automatically by means of preset algorithms in a multimedia program.

6. The method according to claim 1, wherein the step of combining said selected audio files into a combination of audio files consists in arranging said select audio files by means of software buttons in a multimedia program.

7. The method according to claim 1, wherein the step of combining said selected audio files into a combination of audio files consists in arranging said select audio files by means of preset algorithms in a multimedia program.

8. The method according to claim 1, wherein the step of arranging in a random sequence said combination of audio files is performed by means of software buttons in a multimedia program.

9. The method according to claim 1, wherein the step of arranging in a sequence said combinations of audio files is performed automatically by means of preset algorithms in a multimedia program.

10. The method according to claim 7, wherein said combination of audio files is modifiable by a user.

11. The method according to claim 9, wherein said sequence is modifiable by user.

12. The method according to claim 1, wherein said plurality of audio files is stored on a CD-ROM together with said multimedia program.

13. The method according to claim 1, wherein the method is implemented by means of a computer program stored on a CD-ROM.

* * * * *